(12) United States Patent
Koskinen et al.

(10) Patent No.: US 8,070,396 B2
(45) Date of Patent: Dec. 6, 2011

(54) BROACH TOOL AND A BROACH INSERT

(75) Inventors: Jorma Koskinen, Fagersta (SE); Jorgen Borgstrom, Motala (SE); Pajazit Avdovic, Norrkoping (SE)

(73) Assignee: Seco Tools AB, Fagesta (SE)

( * ) Notice: Subject to any disclaimer, the term of this patent is extended or adjusted under 35 U.S.C. 154(b) by 1113 days.

(21) Appl. No.: 11/531,325

(22) Filed: Sep. 13, 2006

(65) Prior Publication Data

US 2007/0065238 A1 Mar. 22, 2007

(30) Foreign Application Priority Data

Sep. 16, 2005 (SE) .................................... 0502062-3

(51) Int. Cl.
*B23P 15/42* (2006.01)
*B23D 37/00* (2006.01)

(52) U.S. Cl. ......................................................... 407/13

(58) Field of Classification Search .................... 407/13, 407/14, 15, 16, 17, 18, 19
See application file for complete search history.

(56) References Cited

U.S. PATENT DOCUMENTS

| | | | |
|---|---|---|---|
| 2,585,832 A | 2/1952 | Phaneuf | |
| 3,641,642 A * | 2/1972 | Schmidt | ........................... 407/17 |
| 3,707,748 A | 1/1973 | Price et al. | |
| 3,914,840 A * | 10/1975 | Ferree et al. | ...................... 407/17 |
| 4,564,320 A * | 1/1986 | Roseliep | .......................... 407/15 |
| 5,451,128 A * | 9/1995 | Hattersley | ...................... 408/204 |
| 6,126,364 A * | 10/2000 | Riviere | ............................. 407/15 |
| 6,413,021 B1* | 7/2002 | Koch et al. | ....................... 407/43 |
| 6,702,524 B2* | 3/2004 | Miller et al. | ..................... 407/13 |
| 6,767,168 B2* | 7/2004 | Miller | .............................. 407/13 |

FOREIGN PATENT DOCUMENTS

| | | |
|---|---|---|
| DE | 2935426 A1 | 3/1981 |
| GB | 890114 A | 2/1962 |
| WO | 02098592 A1 | 12/2002 |

OTHER PUBLICATIONS

Supplementary European Search Report for corresponding European App. EP 06 78 4172.

* cited by examiner

*Primary Examiner* — Will Fridie, Jr.
(74) *Attorney, Agent, or Firm* — WRB-IP LLP

(57) ABSTRACT

A broach tool and a broach insert for chip removing machining of metals are provided. The broach tool includes an elongate holder and at least one cutting unit. The holder comprises at least one recess for the receipt of the cutting unit. The broach tool has a feeding direction. The broach tool includes clamping members for each cutting unit. Each clamping member is arranged in front of the cutting unit in the feeding direction. The cutting unit is a replaceable broach insert including a base part and a cutting part. A notch is formed centrally in a rear side surface of the broach insert. The recess includes a rear wall formed with a projection, the cross section of which is U-shaped and includes arms. The arms are arranged to be elastically deformed by the notch.

21 Claims, 2 Drawing Sheets

BROACH TOOL AND A BROACH INSERT

BACKGROUND AND SUMMARY

The present invention relates to a broach tool and a broach insert according to the preambles of the independent claims.

Broach tools have been used for many years for the machining metallic materials. A conventional broach tool has a number of broach inserts threaded on a threaded rod and fixed by means of a nut. Conventional broach tools have the disadvantage that the replaceability of worn broach inserts has been problematic. Furthermore, in other cases, damage to a cutting edge or some part of the tool has frequently resulted in the entire broach tool having been discarded or in a need of dismantling the entire broach tool. The material from which a unitary broach tool is manufactured has usually been restricted to high-speed steels because of the relatively high cost associated with materials such as cemented carbide.

Although many of the previously known broach tools, which have comprised broach inserts clamped into a tool body, have been a step in the right direction, additional improvements are needed.

It is desirable to provide a broach tool in which the broach inserts are easily replaceable.

It is desirable to provide a stable broach tool.

It is desirable to provide a broach tool where the broach inserts have a good precision.

It is desirable to provide a broach tool that brings savings to the user.

According to an aspect of the present invention, a broach tool for chip removing machining of metals comprises an elongate holder and at least one cutting unit, the holder comprising at least one recess for receipt of the cutting unit, the broach tool having a feeding direction, the broach tool comprising at least one clamping member for each cutting unit, each clamping member being arranged in front of the cutting unit in the feeding direction, wherein the cutting unit is a replaceable broach insert comprising a base part and a cutting part, a notch being formed centrally in a rear side surface of the broach insert and the recess comprises a rear wall formed with a projection being arranged to be elastically deformed by the notch.

According to another aspect of the invention, a broach insert for chip removing machining of metals comprises a base part and a cutting part, the cutting part comprising waved cutting edges, the broach insert being insertable in a recess of an elongate holder, wherein the broach insert comprises a notch formed centrally in a rear side surface of the broach insert, the notch being arranged to elastically deform a projection formed in the recess.

DETAILED DESCRIPTION OF THE PREFERRED EMBODIMENT

Figure 1:
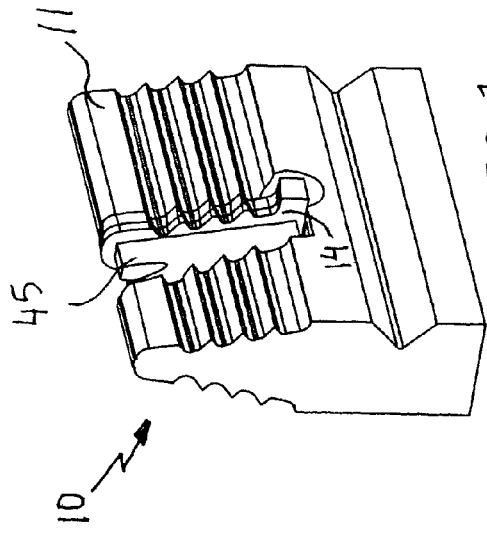
FIG. 1 is a perspective view of an embodiment of a broach tool, comprising a holder and a broach insert according to the present invention.

With reference to the figures, a broach tool 10 is shown comprising a holder 11 of broach inserts 12 according to the present invention. The holder 11 is designed and constructed to receive and safely hold at least one broach insert 12 during a reaming operation. The broach insert 12 is configured for reaming and is formed of a material appropriate for the desired reaming operation, such as preferably coated cemented carbide or high-speed steel, tool steel, or other hard metallic material. With "cemented carbide" is here meant WC, TiC, TaC, NbC, etc., in sintered combination with a binder metal such as for example Co or Ni. The cutting insert is preferably at least partly coated with at least a layer of for example $Al_2O_3$, TiN and/or TiCN. In some cases it can be well-founded that the cutting edges are made of brazed on super hard material such as CBN or PCD. The broach insert 12 has a generally triangular basic shape and comprises a base surface 13, a front side surface 14, a rear side surface 15 as well as two wave-shaped edge surfaces 16 and 17. The edge surfaces 16, 17 meet at a rounded tip 18. Intersecting lines between the front side surface 14 on one hand and the edge surfaces and the tip 18 on the other form cutting edges 19, 20 and 21. The edge surfaces 16, 17 comprise one or more clearance surfaces. The cutting edges 19-21 are intended to cut waved slots in a workpiece, such as in a turbine disk. The cutting edges 19 and 20 do not reach the base surface, and therefore the broach insert may be said to comprise a base part and a cutting part. An example of a common service life of a broach insert according to the present invention is four turbine disks per broach insert, where each disk comprises 60 slots. A notch 22 is formed centrally in the rear side surface 15, substantially perpendicularly to the base surface 13. The notch 22 breaks through at least the base surface 13 and breaks preferably also through the clearance surface of the tip 18. The notch has a depth d1 that is smaller than half the thickness of the broach insert, which is measured between the side surfaces 14 and 15. The notch 22 has walls 23 and 24 facing each other. The notch 22 has a width w1. The walls 23, 24 are substantially perpendicular to a bottom 25 of the notch. The broach insert, when mounted, is arranged substantially in line with previous insert units and at a successively increasing protrusion from the holder 11.

Figure 2:
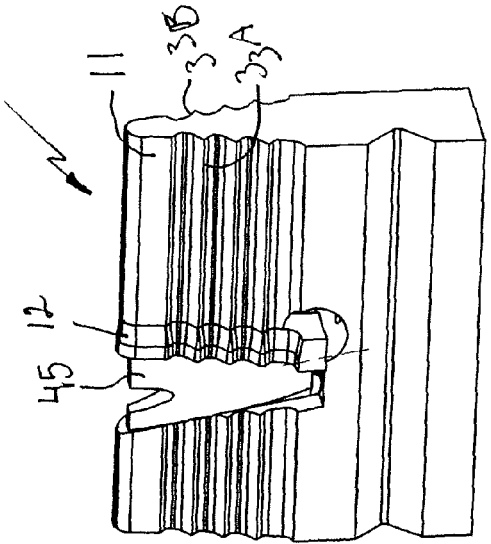
FIG. 2 is another perspective view of the broach tool in FIG. 1.
Figure 3:
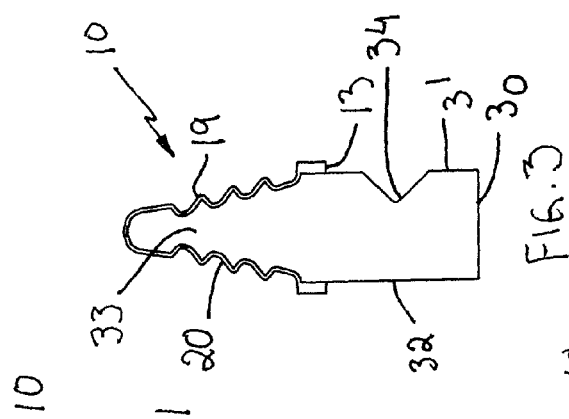
FIG. 3 is an end view of the broach tool in FIG. 1.
Figure 4:
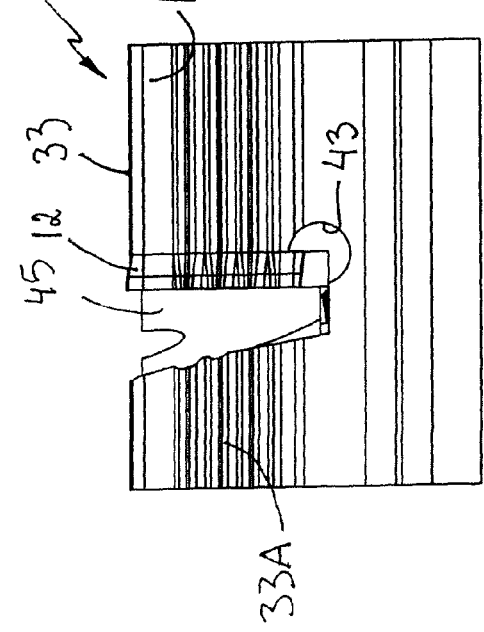
FIG. 4 is a side view of the broach tool.
Figure 5:
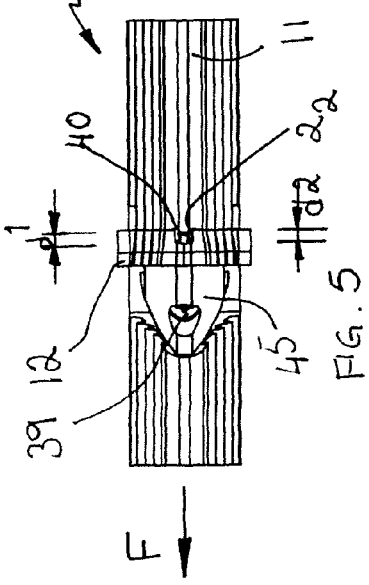
FIG. 5 is a top view of the broach tool.
Figure 7:
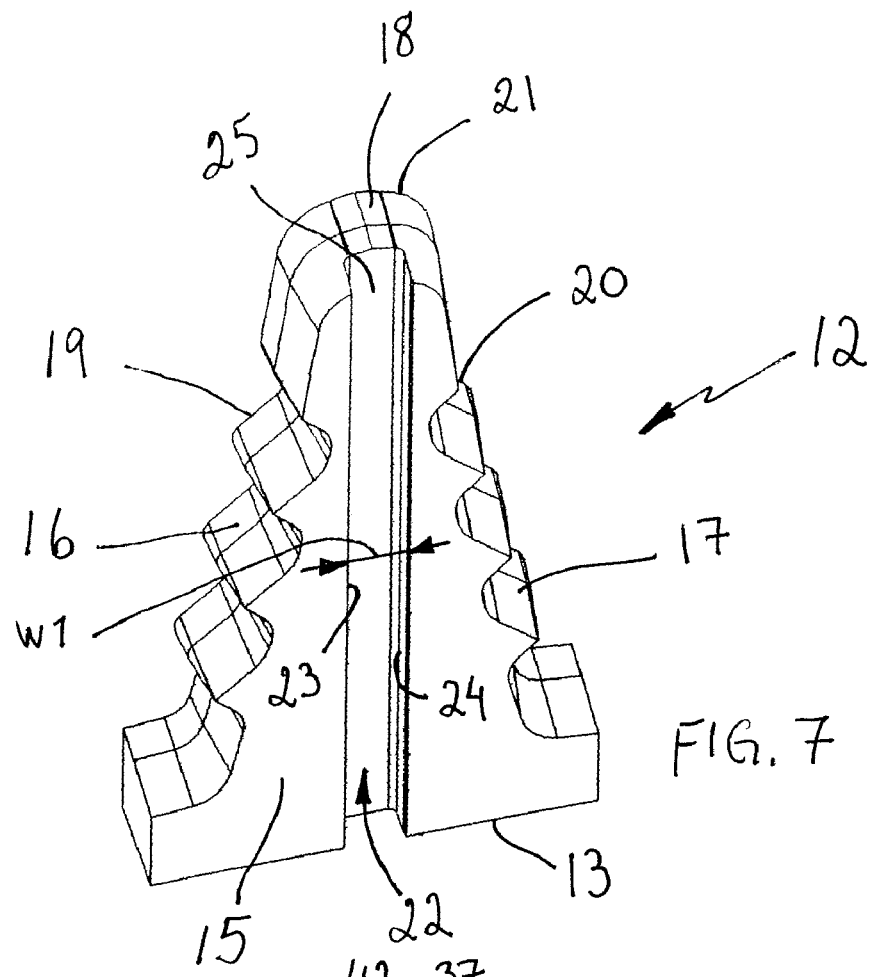
FIG. 7 is a perspective view of an embodiment of a broach insert according to the present invention.
Figure 6:
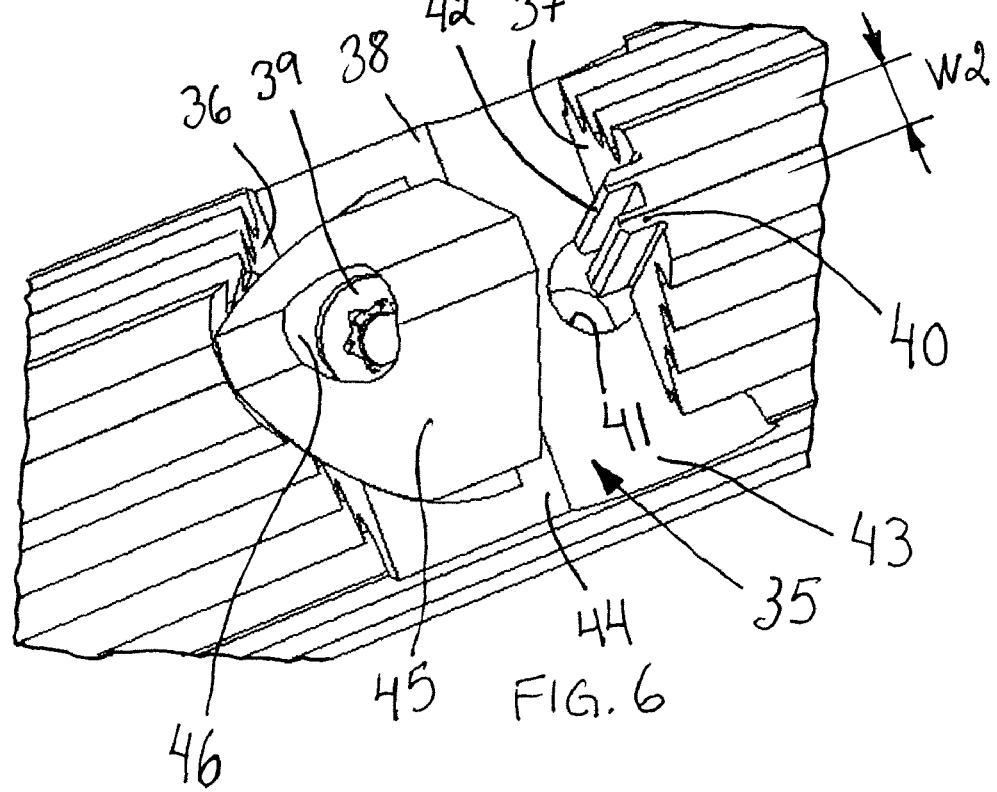
FIG. 6 is a perspective view of the holder shown in FIG. 1-5.

In FIGS. 1-6, a holder 11 is shown to hold a broach insert 12. It is seen that the holder has a substantially rectangular basic shape comprising a base 30, substantially parallel side surfaces 31 and 32 as well as an upper part 33. One of the side surfaces comprises a longitudinal V-shaped groove 34 for clamping. The upper part 33 comprises surfaces 33A and 33B are substantially wave-shaped and mirror-imaged. The surfaces 33A and 33B extend symmetrically relative to a vertical line of the holder. The tool 10 has a feeding direction F. The holder 11 comprises a recess 35, the front wall 36 and rear wall 37 of which converge toward the base 30. The terms "front" and "rear" relates to the feeding direction F. The walls 36, 37 have the same shape, which shape corresponds to the shape of the cutting edges 19 and 20, but have profiles that extend immediately inside the profiles of the edges. The recess 35 has a bottom 38 in which a first hole, not shown, has been provided to receive a clamping member 39 such as a screw, and a second hole 41. The rear wall 37 constitutes a support surface in an insert pocket. The recess 35 opens outward toward the wave-shaped surfaces 33A and 33B for reasons of access. The rear wall 37 is formed with a projection 40, the cross section of which is U-shaped and comprises elastic arms 42. The projection 40 is elongate and has an extension centrally along substantially the entire rear wall 37. The projection 40 has an extension from the rear wall 37 of a distance d2, FIG. 5. In the unloaded state, the projection 40 has a width w2. The second hole 41 is intended to give room for tools in the manufacturing of the projection integrated in the holder. The rear wall 37 connects via a concave fillet 43 to a support surface 44 for the base surface of the broach insert. Preferably, the support surface coincides with the bottom 38. The fillet 43 is intended to provide clearance for a corner of the base surface 13. The support surface 44 is arranged to determine the protrusion of the broach insert from the holder. A clamping member 45 in the form of a wedge is arranged in the recess 35. The wedge 45 has a front and a rear side. Each one of the sides is substantially parallel with the associated wall of the recess, the same forming an acute angle with each other, which angle is 5-15°. The wedge has a through-going hole 46 with a shoulder for the head of the screw 39 to abut against upon tightening.

Upon mounting of the broach tool 10 according to the present invention, first the clamping members 39, 45 are mounted. This is accomplish by inserting the threaded end of the screw 39 through the hole 46 as well as threading it loosely in the second hole 41. Then, the broach insert 12 is brought toward the recess 35 so that the notch 22 enters the projection 40. The width w2 of the projection 40 is greater than the width w1 of the notch, so that the arms 42 of the projection are deformed elastically when the notch of the broach insert is pressed down over the projection. In this way, the broach insert is guided into the correct position. When the base surface 30 of the broach insert abuts against the support surface 44, the screw can be tightened so that the wedge 45 clamps the broach insert against the rear wall 37 without the wedge abutting against the bottom 38. Since the protrusion d2 of the projection is smaller than the depth d1 of the notch, the broach insert will not be supported centrally, which is advantageous from a stability point-of-view. The method is repeated for any additional broach inserts. The insert pockets may be somewhat displaced, about 0.02-0.05 mm, in the vertical direction perpendicularly to the feeding direction so that each broach insert successively comes into engagement with the workpiece, wherein a slot can be formed in the workpiece during the reaming. Alternatively, the insert pockets may be identical but the broach inserts are different, i.e., the broach inserts become successively greater in width and possibly also in height the further back the same are arranged in the holder. The procedure is substantially reversed upon loosening of the broach inserts.

Thus, the present invention relates to a broach tool and a broach insert for chip removing machining, whereby the broach inserts can be replaced fast and easily and which can be mounted with a good precision. Furthermore, the broach insert may absorb a small defect in the centering by the fact that it moves out of the centre of the tool if the centre of the machined slot and the centre of the tool do not entirely coincide. During tests, the cost per finished slot of a turbine disk has been possible to be lowered to one tenth (1/10) with the new broach tool in comparison with prior art. Although the present invention has been developed for the manufacture of turbine components, other applications cannot be excluded.

The disclosures in Swedish patent application No. 0502062-3, from which this application claims priority are incorporated herein by reference.

While this invention has been illustrated and described in accordance with a preferred embodiment, it is recognized that variations and changes may be made therein without departing from the invention as set forth in the claims.

What is claimed is:

1. A broach tool for chip removing machining of metals, comprising an elongate holder and at least one cutting unit, the holder comprising at least one recess for receipt of the cutting unit, the broach tool having a feeding direction, the broach tool comprising at least one clamping member for each cutting unit, each clamping member being arranged in front of the cutting unit in the feeding direction, wherein the cutting unit is a replaceable broach insert comprising a base part and a cutting part, a notch being formed centrally in a rear side surface of the broach insert and the recess comprises a rear wall formed with a projection being arranged to be elastically deformed by the notch.

2. The broach tool according to claim 1, wherein the projection has a cross section which is U-shaped and comprises arms that are elastically deformable and the projection is elongate and has an extension centrally along substantially the entire rear wall.

3. The broach tool according to claim 2, wherein the notch is elongate and has an extension centrally along substantially the entire broach insert.

4. The broach tool according to claim 3, wherein the projection has a width and the notch has a width, the width of the projection in an unloaded state being greater than the width of the notch.

5. The broach tool according to claim 4, wherein the broach insert and the holder have waved parts.

6. The broach tool according to claim 1, wherein the notch is elongate and has an extension centrally along substantially the entire broach insert.

7. The broach tool according to claim 6, wherein the projection has a width and the notch has a width, the width of the projection in an unloaded state being greater than the width of the notch.

8. The broach tool according to claim 7, wherein the broach insert and the holder have similar waved parts.

9. The broach tool according to claim 1, wherein the projection has a width and the notch has a width, the width of the projection in an unloaded state being greater than the width of the notch.

10. The broach tool according to claim 9, wherein the broach insert and the holder have similar waved parts.

11. A broach insert for chip removing machining of metals, comprising a base part and a cutting part, the cutting part comprising waved cutting edges, the broach insert being insertable in a recess of an elongate holder, wherein the broach insert comprises a notch formed centrally in a rear side surface of the broach insert, the notch having substantially parallel side walls, each side wall having a projection engaging surface portion for engaging a projection formed in the recess, wherein the notch extends upwardly from a bottom of the insert through the base part toward the cutting part.

12. The broach insert according to claim 11, wherein the notch extends an entire length of the insert from the bottom to a top of the insert.

13. The broach insert according to claim 11, wherein the notch is elongate and has an extension centrally along substantially the entire broach insert.

14. The broach insert according to claim 13, wherein the notch has a width.

15. The broach insert according to claim 14, wherein the broach insert has a generally triangular basic shape and comprises a base surface, a front side surface, a rear side surface as well as two wave-shaped edge surfaces.

16. The broach insert according to claim 15, wherein the edge surfaces meet at a rounded tip, intersecting lines between the front side surface on one hand and the edge surfaces and the tip on the other forming cutting edges, and in that the edge surfaces comprise one or more clearance surfaces.

17. The broach insert according to claim 11, wherein the notch has a width.

18. The broach insert according to claim 17, wherein the broach insert has a generally triangular basic shape and comprises a base surface, a front side surface, a rear side surface as well as two wave-shaped edge surfaces.

19. The broach insert according to claim 18, wherein the edge surfaces meet at a rounded tip, intersecting lines between the front side surface on one hand and the edge surfaces and the tip on the other forming cutting edges, and in that the edge surfaces comprise one or more clearance surfaces.

20. The broach insert according to claim 11, wherein the broach insert has a generally triangular basic shape and comprises a base surface, a front side surface, a rear side surface as well as two wave-shaped edge surfaces.

21. The broach insert according to claim 20, wherein the edge surfaces meet at a rounded tip, intersecting lines between the front side surface on one hand and the edge surfaces and the tip on the other forming cutting edges, and in that the edge surfaces comprise one or more clearance surfaces.

* * * * *